US012551737B2

(12) United States Patent
Jones

(10) Patent No.: US 12,551,737 B2
(45) Date of Patent: Feb. 17, 2026

(54) SHAPED THREE DIMENSIONAL MASK WITH REPLACEABLE FILTER

(71) Applicant: Scott Jones, Bellingham, WA (US)

(72) Inventor: Scott Jones, Bellingham, WA (US)

( * ) Notice: Subject to any disclaimer, the term of this patent is extended or adjusted under 35 U.S.C. 154(b) by 684 days.

(21) Appl. No.: 17/920,100

(22) PCT Filed: Apr. 22, 2021

(86) PCT No.: PCT/US2021/028557
§ 371 (c)(1),
(2) Date: Oct. 20, 2022

(87) PCT Pub. No.: WO2021/216817
PCT Pub. Date: Oct. 28, 2021

(65) Prior Publication Data

US 2023/0166136 A1 Jun. 1, 2023

Related U.S. Application Data

(60) Provisional application No. 63/014,079, filed on Apr. 22, 2020.

(51) Int. Cl.
*A62B 23/02* (2006.01)
*A41D 13/11* (2006.01)

(52) U.S. Cl.
CPC ........ *A62B 23/025* (2013.01); *A41D 13/1115* (2013.01)

(58) Field of Classification Search
CPC .......................... A62B 23/025; A41D 13/1115
USPC ..................................................... 128/206.19
See application file for complete search history.

(56) References Cited

U.S. PATENT DOCUMENTS 2,565,124 A * 8/1951 Durborow .............. A41D 13/11 2/206
7,171,967 B2 2/2007 Brunell et al.
7,858,163 B2 12/2010 Angadjivand et al.
10,238,158 B2 * 3/2019 Duffy ................. A41D 13/1138
2010/0051032 A1 * 3/2010 Kim ................... A41D 13/1115 128/206.19
2010/0154805 A1 6/2010 Duffy et al.
2015/0059772 A1 * 3/2015 Duffy ................. A41D 13/1138 29/896.62

(Continued)

FOREIGN PATENT DOCUMENTS

WO 2008085546 A2 7/2008
WO WO-2015031066 A2 * 3/2015 ......... A41D 13/1138

*Primary Examiner* — Clinton T Ostrup
(74) *Attorney, Agent, or Firm* — Verrill Dana, LLP

(57) ABSTRACT

A facemask assembly has a three dimensional shape to fit a user's face while covering a user's mouth and nose and providing a space in front of the user's mouth and nostrils. The facemask assembly includes an outer shell layer and an inner lining layer connected to provide a facemask panel having the three-dimensional shape and an interior space to retain a filter. A face stiffener extends through the interior space along a mid-region and curved away from the user's mouth to assist in stiffening the facemask panel and in keeping the three-dimensional facemask shape spaced from the user's mouth. Magnets can also be used to aid is retaining the facemask assembly as a shaped unit. An adjustment tab can aid in adjusting the facemask assembly on the face. The facemask assembly can be pulled down when safe while retaining it three-dimensional shape.

19 Claims, 14 Drawing Sheets

(56) References Cited

U.S. PATENT DOCUMENTS

| | | | | |
|---|---|---|---|---|
| 2017/0157435 | A1 | 6/2017 | Choi | |
| 2018/0078797 | A1* | 3/2018 | Bergman | A62B 18/084 |
| 2021/0059377 | A1* | 3/2021 | Tulit | A45D 44/002 |
| 2021/0162243 | A1* | 6/2021 | Yang | A62B 18/025 |
| 2021/0298382 | A1* | 9/2021 | Kilbey | A41D 13/1161 |
| 2021/0345696 | A1* | 11/2021 | Farshoukh | A41D 13/113 |
| 2022/0095734 | A1* | 3/2022 | Welch, Sr. | A41D 13/1161 |
| 2022/0125135 | A1* | 4/2022 | Law | A41D 13/1161 |
| 2022/0322766 | A1* | 10/2022 | Franoszek | A41D 13/1192 |
| 2023/0165324 | A1* | 6/2023 | Birgen | A62B 23/025 128/863 |

* cited by examiner

SHAPED THREE DIMENSIONAL MASK WITH REPLACEABLE FILTER

CROSS REFERENCE TO RELATED APPLICATIONS

This application claims benefit under 35 U.S.C. § 119(e) of U.S. Provisional Application No. 63/014,079, filed on 22 Apr. 2020, entitled “Shaped Three Dimensional Mask with Replaceable Filter,” the disclosure of which is hereby incorporated by reference.

BACKGROUND

A facemask covers a user’s nose and mouth to minimize or prevent the spread of air-borne particles that may cause diseases and/or minimize or prevent inhalation of air-borne dust or other particles. Facemasks are used by healthcare workers and many other people in a variety of occupations or environments. They are often worn in public settings and on public transportation.

SUMMARY

A facemask assembly is provided that has a three-dimensional (3D) shape to fit a user’s face while covering the user’s mouth and nose and providing a space in front of the user’s mouth and nostrils. The facemask assembly can retain a continuous, replaceable, non-perforated filter therein, is sealed by contact with the user’s face, and is comfortable to wear. The facemask assembly includes a 3D shaped facemask panel, formed by shaped panels of an outer shell layer and an inner lining layer, and a face stiffener or stiffening insert. Due to the 3D shape and the stiffening insert, the 3D facemask assembly provides a space in front of the mouth and nostrils as well as enabling a contacting fit or seal with the face around the periphery, from nose bridge to chin and cheek to cheek. A continuous, replaceable, non-perforated filter can be retained in an interior space between the outer shell layer and the inner lining layer or filter, for example by insertion into a pocket formed between the outer shell layer and the inner lining layer or by attachment points about the periphery of the facemask panel. In so doing, the protective shape is formed, while providing continuous, replaceable, filtration.

Embodiments, features, and aspects of the facemask assembly include the following:

1. A facemask assembly, comprising:
   - (i) an outer shell layer and an inner lining layer, peripherally joined to form a facemask panel having an interior space to hold a filter material, each layer comprising two side panels and two center panels, wherein:
     - each side panel, when flat, has a concave outer edge, a convex mid-line edge, and straight upper and lower edges,
     - each center panel, when flat, has a convex center edge, a concave mid-line edge, a straight upper edge, a straight lower edge, and a straight chin-line edge extending from an end of the straight lower edge to a lower end of the convex center edge, wherein in the outer shell layer:
     - the center panels are joined along the respective convex center edges and along the respective chin-line edges to form an outer layer three-dimensional central face seam, and

- each side panel and a corresponding one of each center panel are joined along the respective convex mid-line edge and concave mid-line edge to form a three-dimensional mid-cheek seam;

wherein in the inner lining layer:
     - the center panels are joined along the respective convex center edges and along the respective chin-line edges to form an inner layer three-dimensional central face seam,
     - one of the side panels and a corresponding one of the center panels are joined along the respective convex mid-line edge and concave mid-line edge to form a three-dimensional mid-cheek seam,
     - the other of the side panels and a corresponding other one of the center panels are overlapped along the respective convex mid-line edge and concave mid-line edge to form a three-dimensional mid-cheek slot for insertion or removal of a filter material or are joined along the respective convex mid-line edge and concave mid-line edge to form a further three-dimensional mid-cheek seam;

wherein the outer shell layer and the inner lining layer are joined together about a periphery with the side panels aligned along the respective concave outer edges and the respective upper and lower edges, and the center panels aligned along the respective upper and lower edges, to form the facemask panel having a three-dimensional facemask shape with side edges that conform to a user’s cheek area, and with the three-dimensional central face seam extending generally vertically from the user’s nose bridge to a region below the user’s chin and with a central region spaced from the user’s mouth, and the interior space between the outer shell layer and the inner lining layer to retain the filter material;
   - (ii) a face stiffener extending generally horizontally through the interior space along a mid-region of the facemask panel and curved away from the user’s mouth to provide stiffening of the facemask panel to form the three-dimensional facemask shape spaced from the user’s mouth; and
   - (iii) one or more attachment members attached at the side panels having a length to affix the facemask assembly on the user’s face to cover the user’s nose and mouth.
2. The facemask assembly of 1, wherein the face stiffener comprises a resilient and/or malleable wire attached generally horizontally along the mid-region.
3. The facemask assembly of any of 1-2, further comprising a pocket or holder along each side edge of the facemask panel to retain respective ends of the face stiffener.
4. The facemask assembly of any of 1-3, further comprising a tube along an inner side of the facemask panel to retain the face stiffener.
5. The facemask assembly of any of 1-4, further comprising a tab extending outwardly from the three-dimensional face seam of the outer shell, the tab graspable to adjust the three-dimensional facemask shape.
6. The facemask assembly of any of 1-5, further comprising a pair of magnets disposed in the mid-region of the facemask panel, a first magnet attached on an interior side of the inner lining layer and a second magnet attached on an interior side of the outer shell layer, the pair of magnets aligned to magnetically adhere together.

7. The facemask assembly of any of 1-6, further comprising a resilient and/or malleable nose wire attached generally horizontally along a nose bridge area near the upper edge of the facemask panel to provide stiffening of the three-dimensional facemask shape and shaping of the three-dimensional facemask shape over a user's nose bridge.
8. The facemask assembly of any of 1-7, further comprising a tube along the nose bridge area near the upper edge of the facemask panel to retain the nose wire.
9. The facemask assembly of any of 1-8, wherein the outer shell layer and the inner lining layer are formed form a fabric of natural fibers, synthetic fibers, or a blend thereof, wherein the natural fibers include cotton, silk, linen, wool, and rayon, and the synthetic fibers include polyester, nylon, and acrylic.
10. The facemask assembly of any of 1-9, wherein the outer shell layer and the inner lining layer are formed from a fabric comprising a cotton material, a polyester material, a nylon material, or a blend thereof.
11. The facemask assembly of any of 1-10, further comprising a filter material within the interior space.
12. The facemask assembly of any of 1-11, wherein the filter material is a meltblown polypropylene.
13. The facemask assembly of any of 1-12, wherein the filter material is selected to trap at least 81% of particles ranging from 0.3 to 10 microns.
14. The facemask assembly of any of 1-13, wherein the filter material has a trapping efficiency of 81%-99% for particles from 0.3 to 1.0 microns, at least 94% for particles from 1-3 microns, or at least 97% for particles from 3-10 microns.
15. The facemask assembly of any of 1-14, wherein the filter material has a periphery that conforms to the interior space, the periphery including a notch to fit around a chin region in the interior space.
16. The facemask assembly of any of 1-15, wherein the one or more attachment members include one or more of a fabric tie, an elastic member, and a hook.
17. The facemask assembly of any of 1-16, wherein the outer shell layer and the inner lining layer are joined together about the periphery with one or more of stitching, ultrasonic welding, adhesive, magnetic fasteners, and snap fasteners.
18. The facemask assembly of any of 1-17, further comprising one or more attachment points for the filter material, the attachment points including one or more of magnetic fasteners and snap fasteners.
19. The facemask assembly of any of 1-18, wherein the one or more attachment points for the filter material are disposed in a mid-region of the facemask panel and/or at locations about the periphery of the facemask panel.
20. The facemask assembly of any of 1-19, wherein the one or more attachment points are disposed at corner locations of the periphery of the facemask panel.

DETAILED DESCRIPTION

Figure 1:
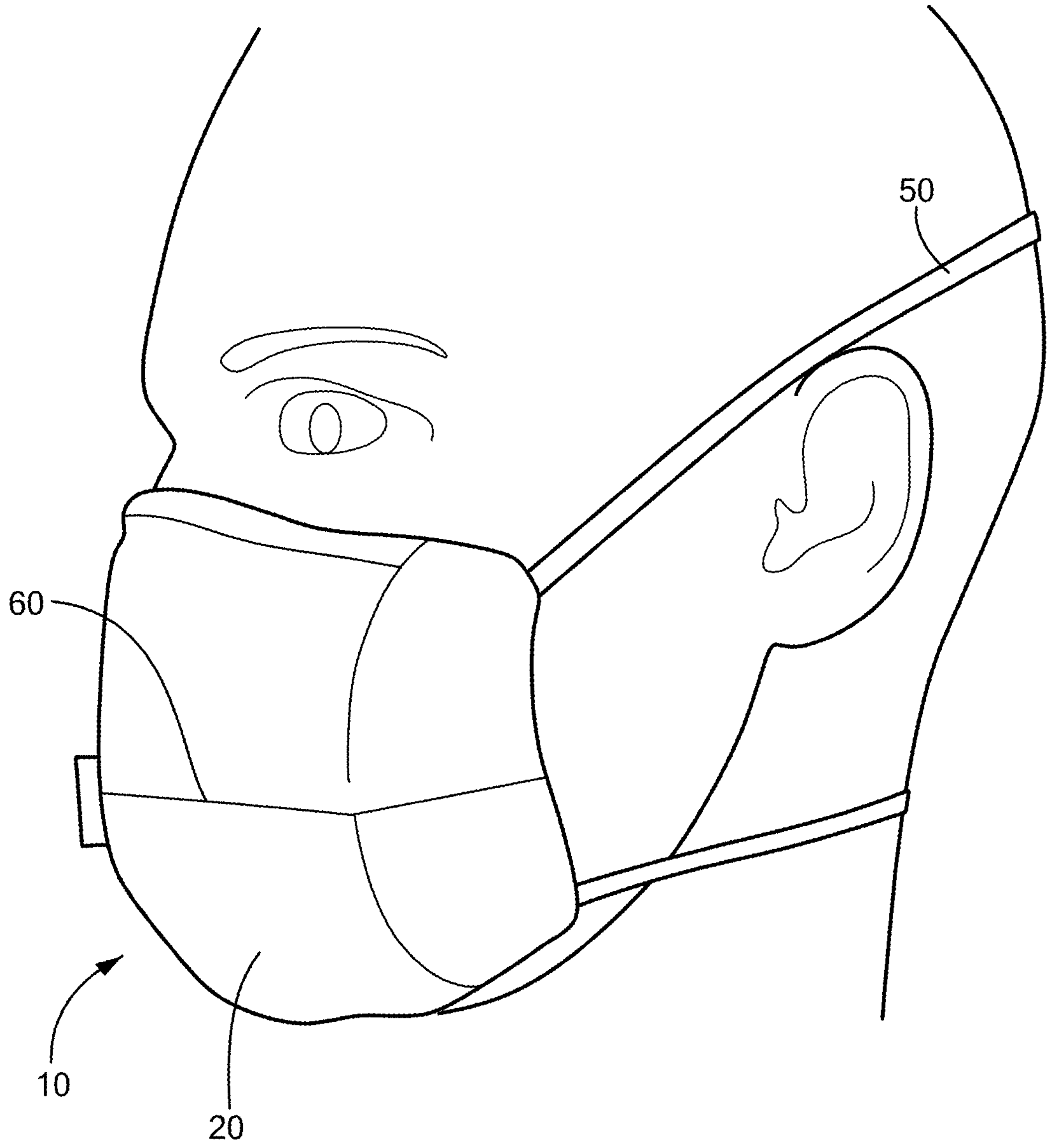
FIG. 1 is a schematic side view of an embodiment of a facemask assembly worn on a user's face.
Figure 2:
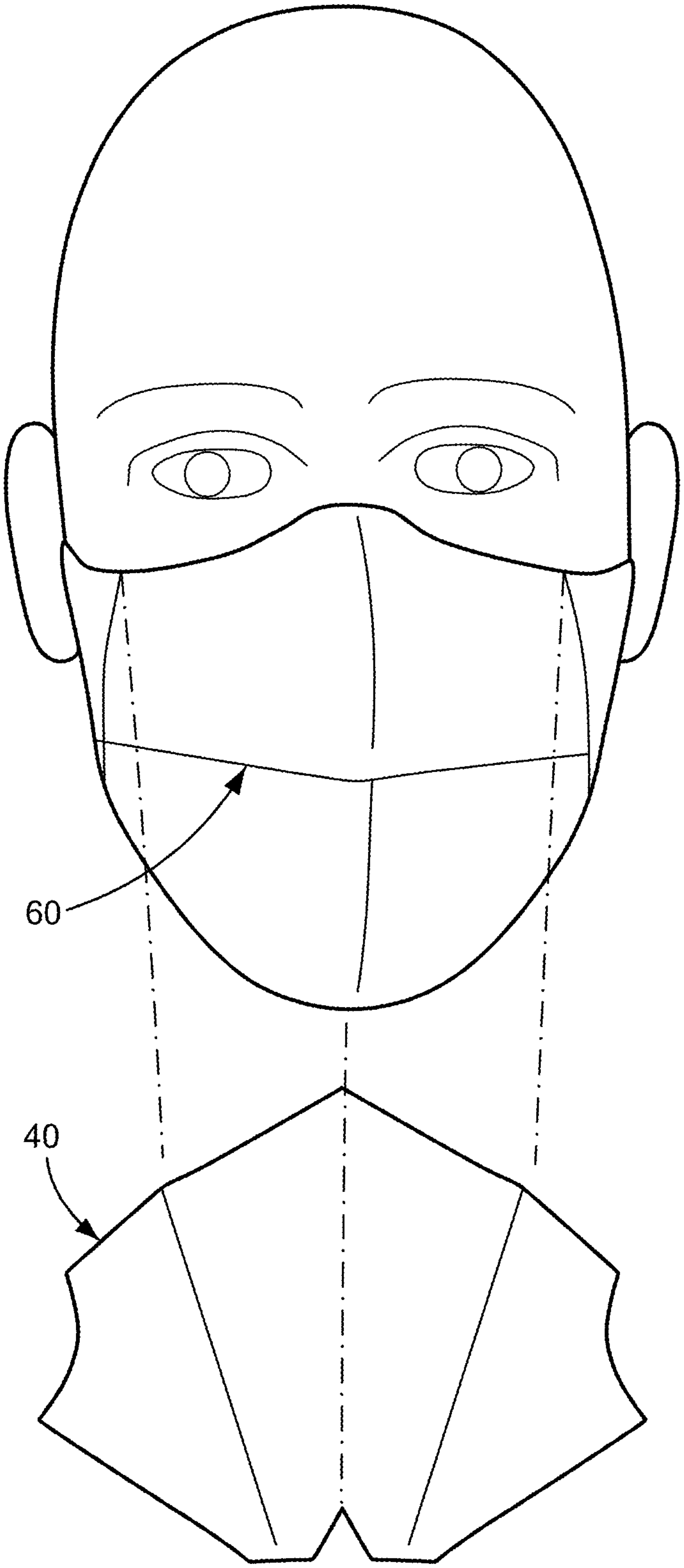
FIG. 2 is a front view of the facemask assembly of FIG. 1, partially exploded to illustrate location of a filter upon internal insertion.
Figure 4:
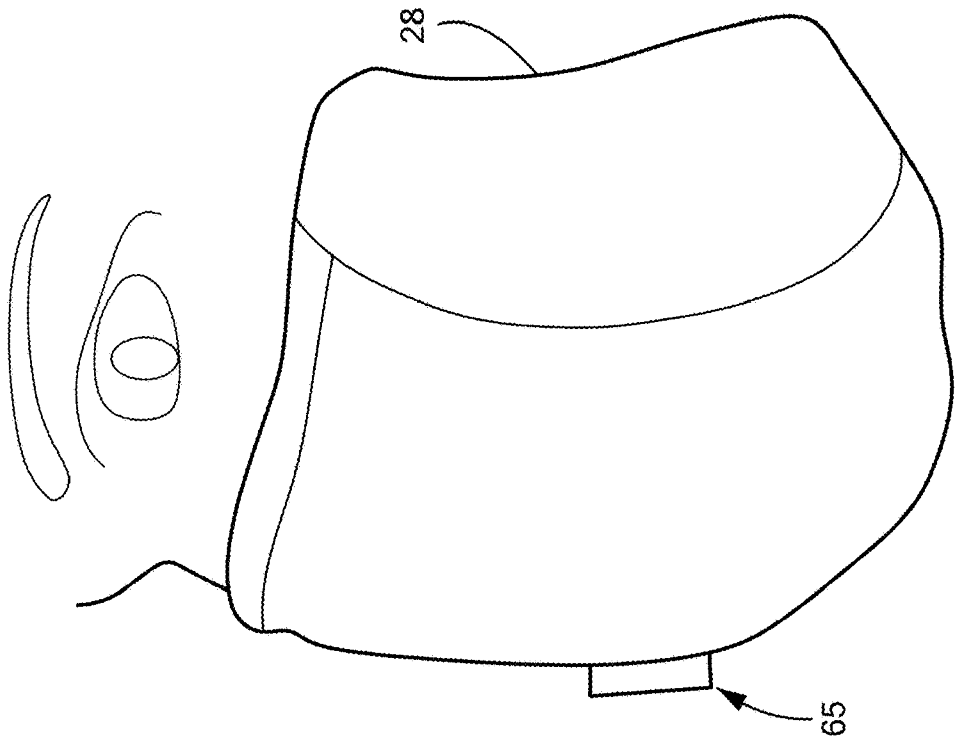
FIG. 4 is a partial view of the facemask assembly of FIG. 1 illustrating a mask adjuster.
Figure 3:
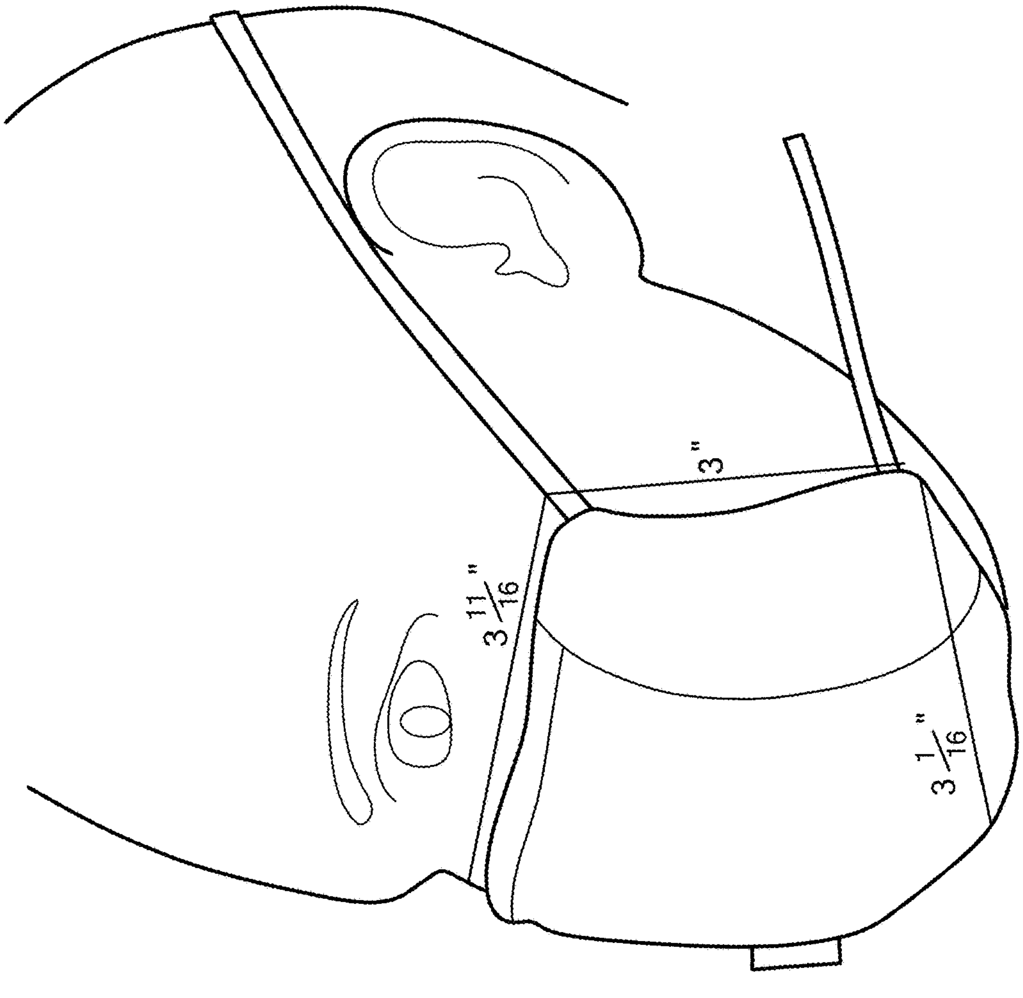
FIG. 3 is a side view showing exemplary finished dimensions of the facemask assembly of FIG. 1.

A facemask assembly 10 is provided that has a three-dimensional shape to fit a user's face while covering a user's mouth and nose. See FIGS. 1-4. The facemask assembly can be shaped and stiffened to be spaced away from the user's mouth and nostrils while providing a suitable contact with the user's face about its periphery to form a seal sufficient to prevent or minimize passage of air-borne particles. The facemask assembly includes a shaped facemask panel 20 including an interior space into which a suitable filter 40 can be inserted. The filter can be removed, and the facemask panel can be washed and reused upon insertion of a new filter. Any suitable attachment members 50 for attaching the facemask assembly to the user's face can be provided, such as elastic loops or ties that extend around the ears or head. The facemask assembly can provide a comfortable, filtered, sealed mask.

Referring more particularly to FIGS. 1-8, an embodiment of a facemask assembly 10 includes an outer shell layer 24 and an inner lining layer 26 formed as panels connected to provide the facemask panel 20 having a three-dimensional shape. An interior space between the outer shell layer and the inner lining layer can retain the filter 40. A face stiffener 60 extends generally horizontally through the interior space along a mid-region facemask panel 20 and curved away from the user's mouth to assist in stiffening the facemask panel and keeping the three-dimensional facemask shape spaced from the user's mouth.

The facemask panel 20 can be made from a fabric, cloth, textile, or other sheet-like flexible material, referred to collectively as a fabric herein. Suitable fabrics can be made from one or more materials selected to be safe and comfortable against a user's face while allowing a user to breathe. For example, the fabric can be made from natural or synthetic fibers or blends thereof. Natural fibers can include, without limitation, cotton, silk, linen, wool, and rayon. Synthetic fibers can include, without limitation, polyester and acrylic. The fabric can be formed in any suitable manner, such as from fibers that are woven, non-woven, felted, or knitted. In some embodiments, the fabric can be a cotton material, a polyester material, a nylon material, or a blend of two or more of these materials.

The outer shell layer 24 and the inner lining layer 26 are joined about a periphery 28, continuously or at spaced intervals, to form the facemask panel 20 having an interior space to hold the filter 40. Each layer comprises two side panels (24-1, 24-4, 26-1, 26-4) and two center panels (24-2, 24-3, 26-2, 26-3). Each side panel has a concave outer edge 31, a convex mid-line edge 32, and straight upper and lower edges 33. Each center panel has a convex center edge 35, a concave mid-line edge 36, a straight upper edge 37*a,* a straight lower edge 37*b,* and a straight chin-line edge 38 extending between an end of the straight lower edge 37*b* and a lower end of the concave mid-line edge 35.

Regarding the outer shell layer 24, the center panels 24-2, 24-3 are joined at a seam along the respective convex center edges 35 and along the respective chin-line edges 38 to form a three-dimensional central face seam. Each side panel 24-1, 24-4 and a corresponding one of each center panel 24-2, 24-3 are joined at a seam along the respective convex mid-line edge 32 and concave mid-line edge 36 to form a three-dimensional mid-cheek seam.

Regarding the inner lining layer 26, the center panels 26-2, 26-3 are joined at a seam along the respective convex center edges 35 and along the respective chin-line edges 38 to form a three-dimensional central face seam. One, 26-1, of the side panel and a corresponding one, 26-2, of the center panels are joined at a seam along the respective convex mid-line edge 32 and concave mid-line edge 36 to form a three-dimensional mid-cheek seam. In some embodiments, the other, 26-4, of the side panels and a corresponding one, 26-3, of the center panels are overlapped but not joined along the respective convex mid-line edge and concave mid-line edge to form a three-dimensional mid-cheek slot for insertion or removal of a filter. In some embodiments, the other of the side panels and a corresponding one of the center panels are joined along the respective convex mid-line edge and concave mid-line edge.

The outer shell layer 24 and the inner lining layer 26 are joined together about a periphery 28 with the side panels aligned along the respective concave outer edges and the respective upper and lower edges. The center panels are aligned along the respective upper and lower edges. In this manner, the outer shell layer and the inner lining layer are joined to form the facemask panel having a three-dimensional facemask shape with three-dimensional side edges that curve to conform to a user's cheek area, with the three-dimensional mid-check seams that extend generally vertically from the upper edge to the lower edge, and with the three-dimensional central face seam that extends generally vertically from the user's nose bridge to a region below the user's chin. The three-dimensional shape of the shaped mask is thus able to be spaced away from the user's mouth and nostrils while worn.

Figure 6:
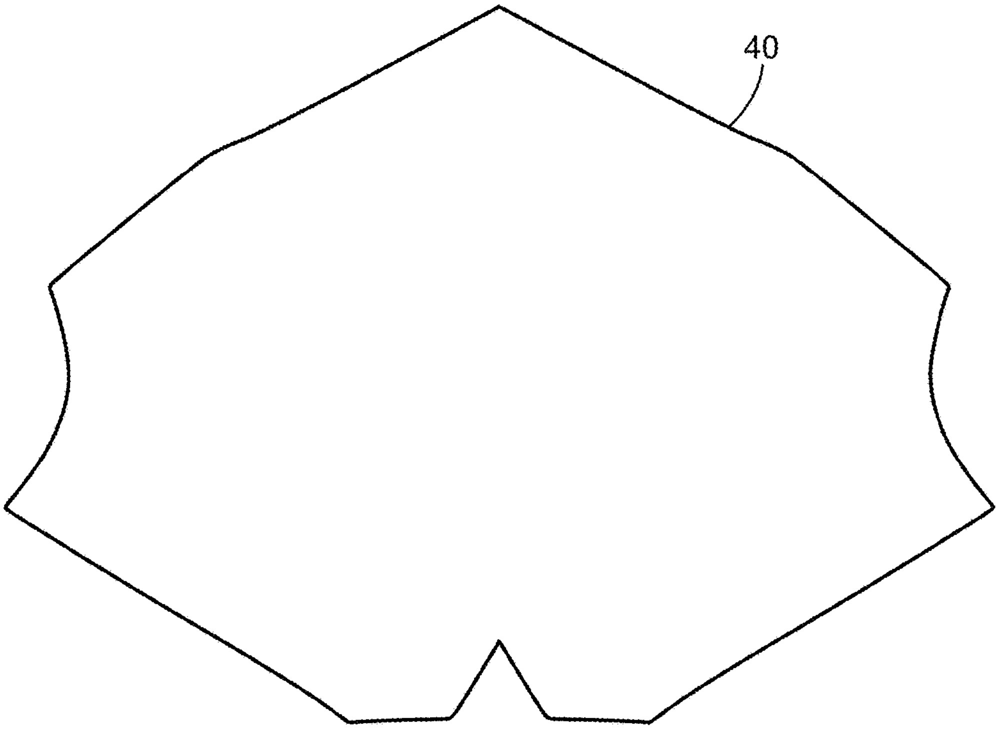
FIG. 6 is a plan view of a shape of a filter illustrated in two-dimensional form prior to insertion in a facemask assembly.
Figure 7:
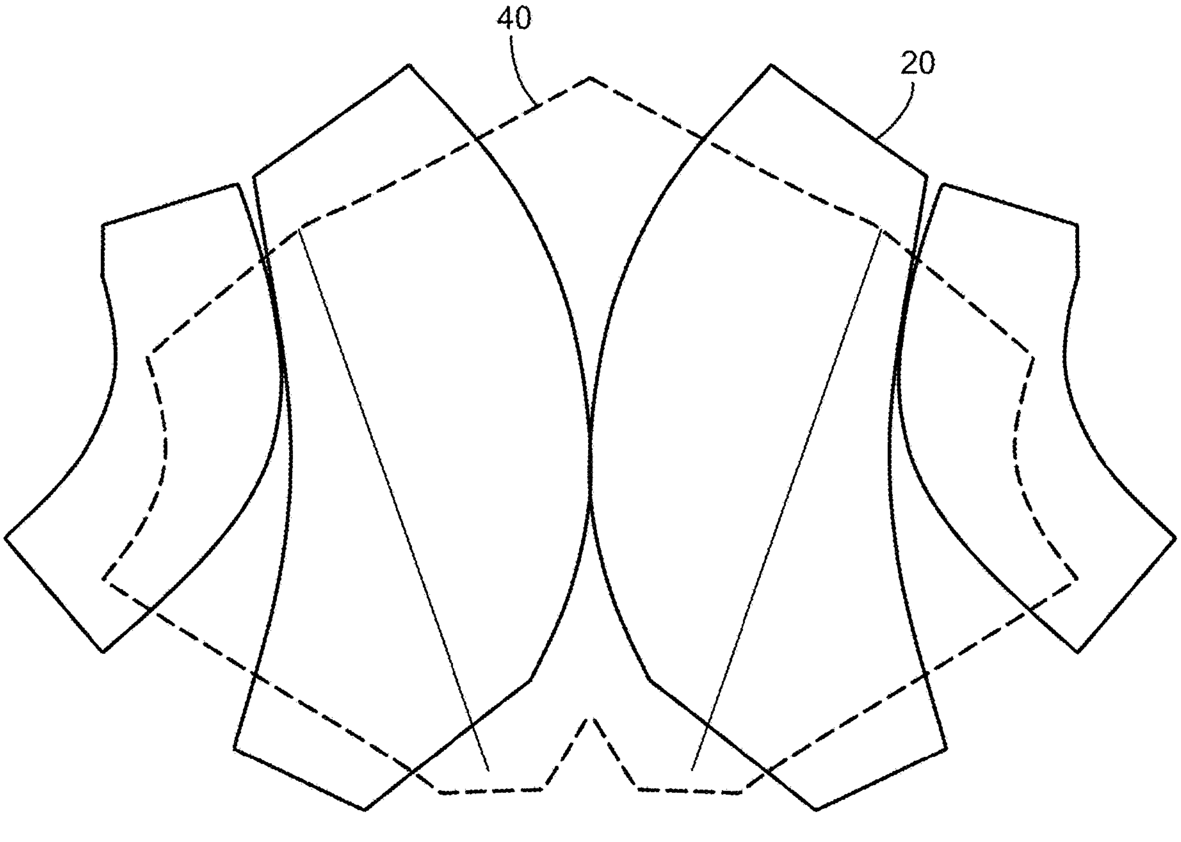
FIG. 7 is a plan view of the panels of the three-dimensional shapes in two-dimensional form (in solid lines), overlaying the two-dimensional filter shape (in dashed lines) for comparison.
Figure 8:
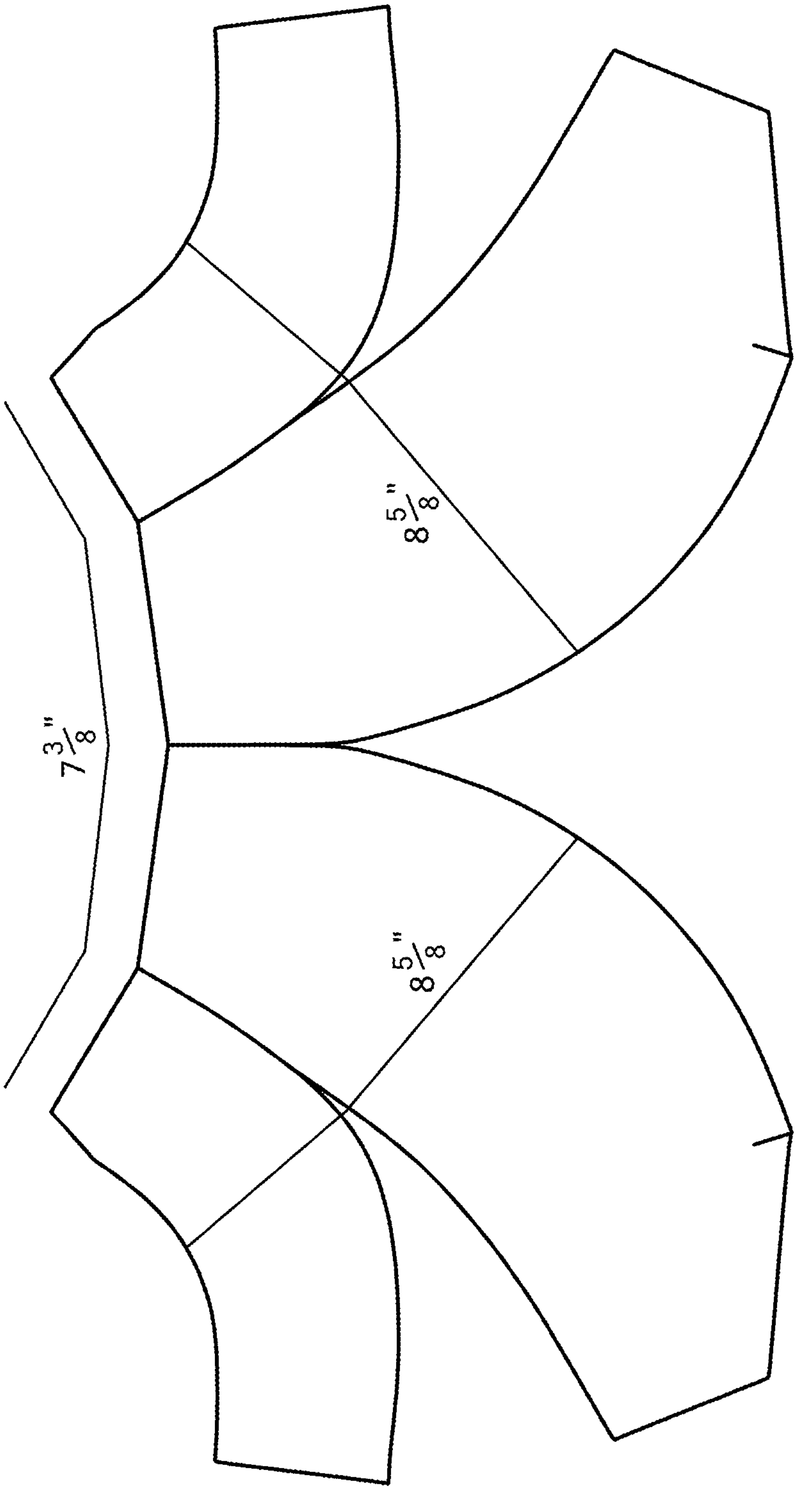
FIG. 8 is a plan view with exemplary dimensions of an embodiment of a finished three-dimensional mask, illustrated in two-dimensional form.
Figure 11:
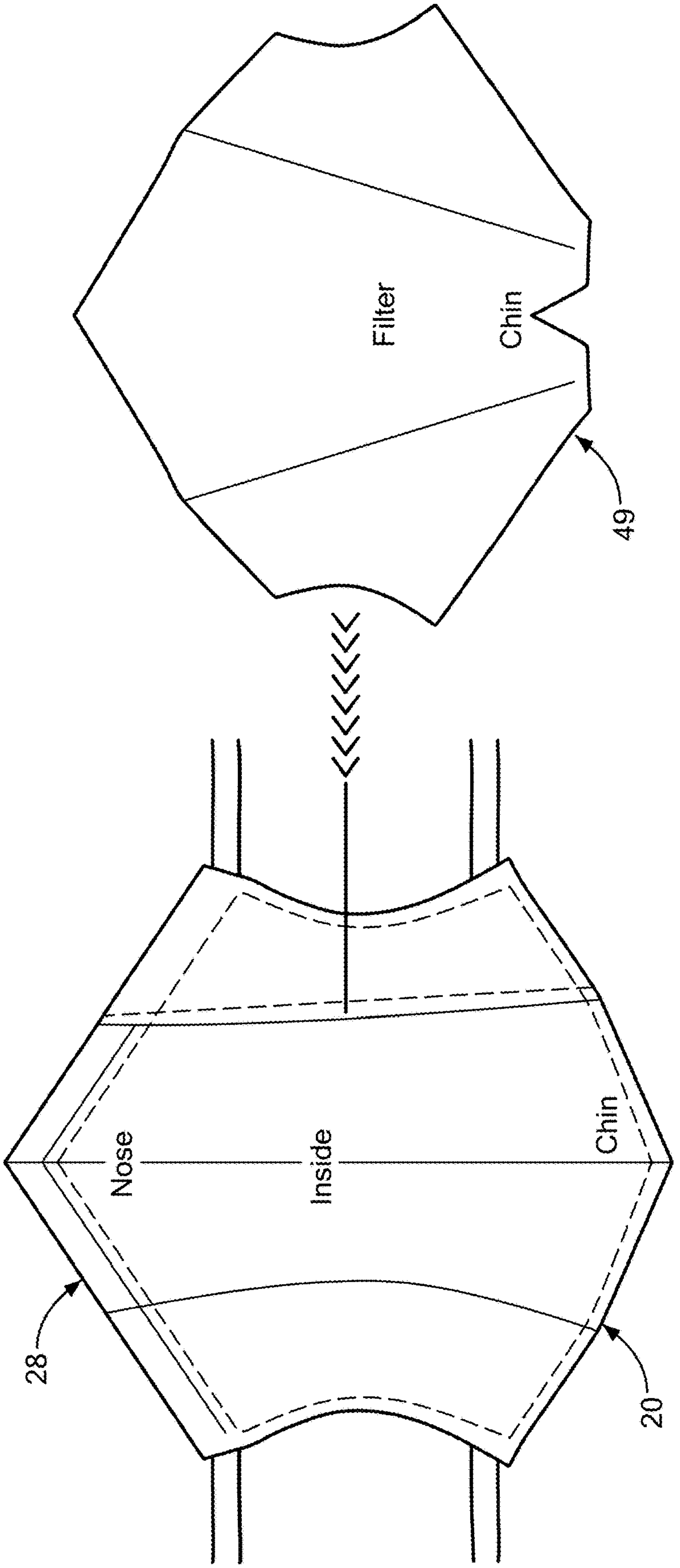
FIG. 11 is an exploded view illustrating a location of a two-dimensional filter for insertion into a three-dimensional facemask assembly.
Figure 12:
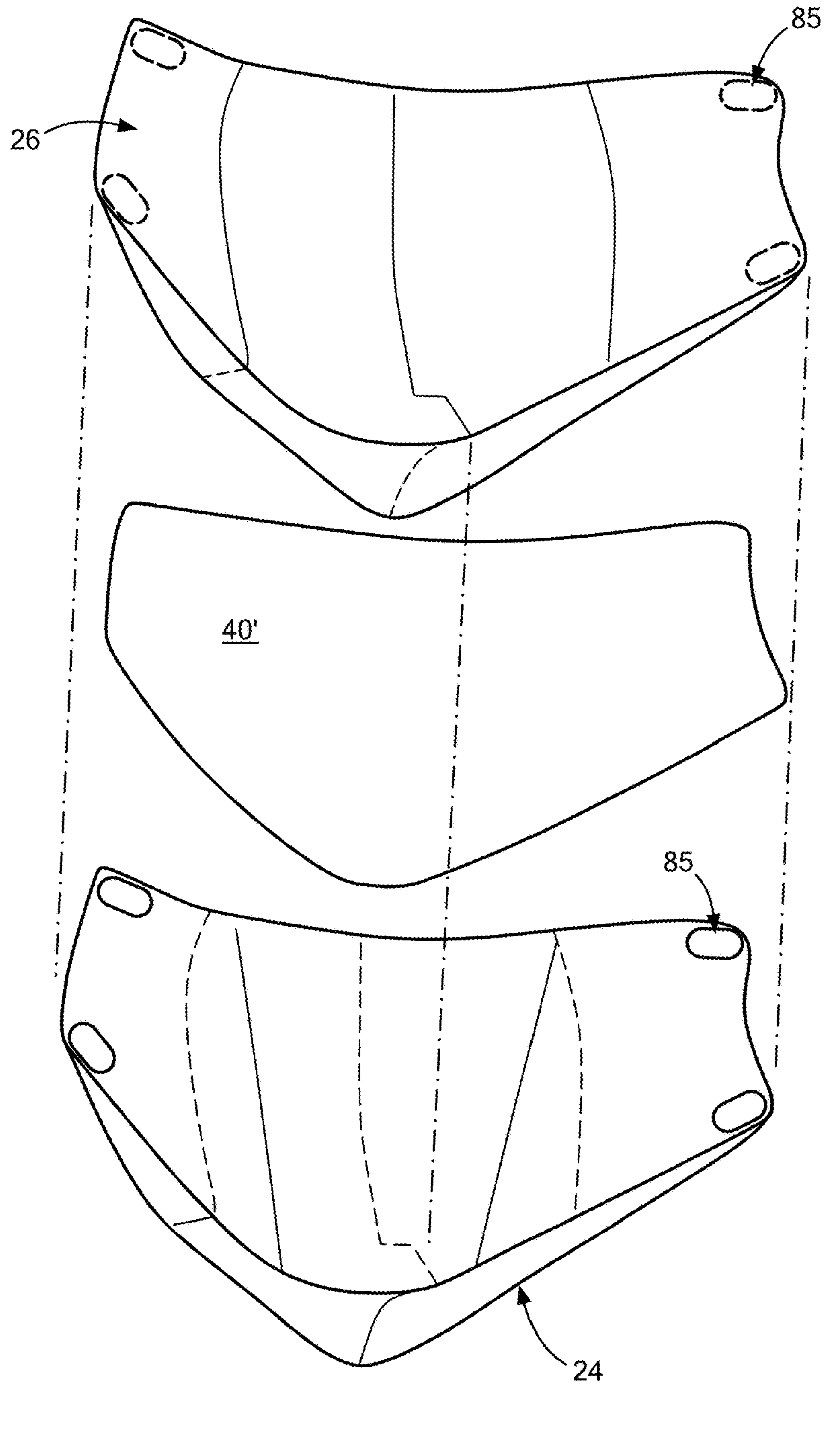
FIG. 12 is an exploded view illustrating a second embodiment of a facemask assembly.

The interior space between the outer shell layer 24 and the inner lining layer 26 can retain the filter 40. The filter is formed from a flat, flexible sheet-like material. The material can be cut to an appropriate shape to fit within the interior space. For example, as illustrated in FIGS. 6 and 7, the filter can be cut to fit the curved and straight edges and the shaped chin region. In some embodiments, the filter 40 can be inserted into the interior space by passing through the mid-cheek slot. See FIG. 11. In some embodiments, the filter 40' can be retained between the outer shell layer and the inner lining layer by magnets. See FIG. 12. Once inserted, the filter is then a part of the facemask assembly. The shape of the filter, as cut to the appropriate shape, can enable the filter to fold or otherwise deform to the three-dimensional shape of the facemask panel. The filter can be selected to have a stiffness that aids in retaining the shaped facemask panel in a position spaced away from the user's mouth while worn.

The filter is continuous and non-perforated. It can be selected to provide a variety of levels of protection. In some embodiments, the filter material can be selected to provide a trapping efficiency of at least 81% of particles ranging from 0.3 to 10 microns. The filter material can be selected to provide a trapping efficiency of 81%-99% for particles from 0.3 to 1.0 microns, at least 94% for particles from 1-3 microns, or at least 97% for particles from 3-10 microns. Filters above or below these levels can also be chosen. Pressure drop can be selected to be within a reasonable range for comfort in breathing. The level of protection can be selected to provide protection against viruses, such as, without limitation, influenza and coronavirus, in environments where people may gather. The level of protection can be selected to provide protection against inhalation of dust or other particles in work environments. Such environments can include, without limitation, medical facilities, educational facilities, stores, workplaces, construction sites, public transportation, and the like. A suitable type of filter material is melt blown polypropylene. Other filter materials can be used. The choice of filter material can be made depending on the application or environment in which the facemask assembly is to be worn.

The facemask assembly 10 can include a face stiffener 60 extending generally horizontally along a mid-region of the facemask assembly to provide additional stiffening to aid in retaining the shaped mask in a position spaced away from the user's mouth while worn. The face stiffener can be a malleable and/or resilient wire. In some embodiments, the face stiffener can extend across the inside of the outer shell layer from one side panel outer edge to the other side panel outer edge. In some embodiments, the face stiffener can be fastened or otherwise attached at each outer edge of the facemask panel, for example, within pockets or holders. In some embodiments, the face stiffener can be disposed within a tube extending across the mid region of the facemask panel. Any suitable gauge wire can be used, such as 16 to 20 gauge.

The facemask assembly can include an adjustment tab 65 extending from the three-dimensional face seam of the outer shell layer. The tab can be located generally in the mid-region of the facemask assembly. The tab can be located generally in the area of the face stiffener. The tab can be grasped by a user to aid the user in adjusting the shaped mask on the user's face without compromising the integrity of the contact seal along the periphery of the facemask assembly. The tab can be formed form any suitable material, such as a fabric, including the same fabric forming the facemask panel, or a rubber or plastic material.

Figure 9:
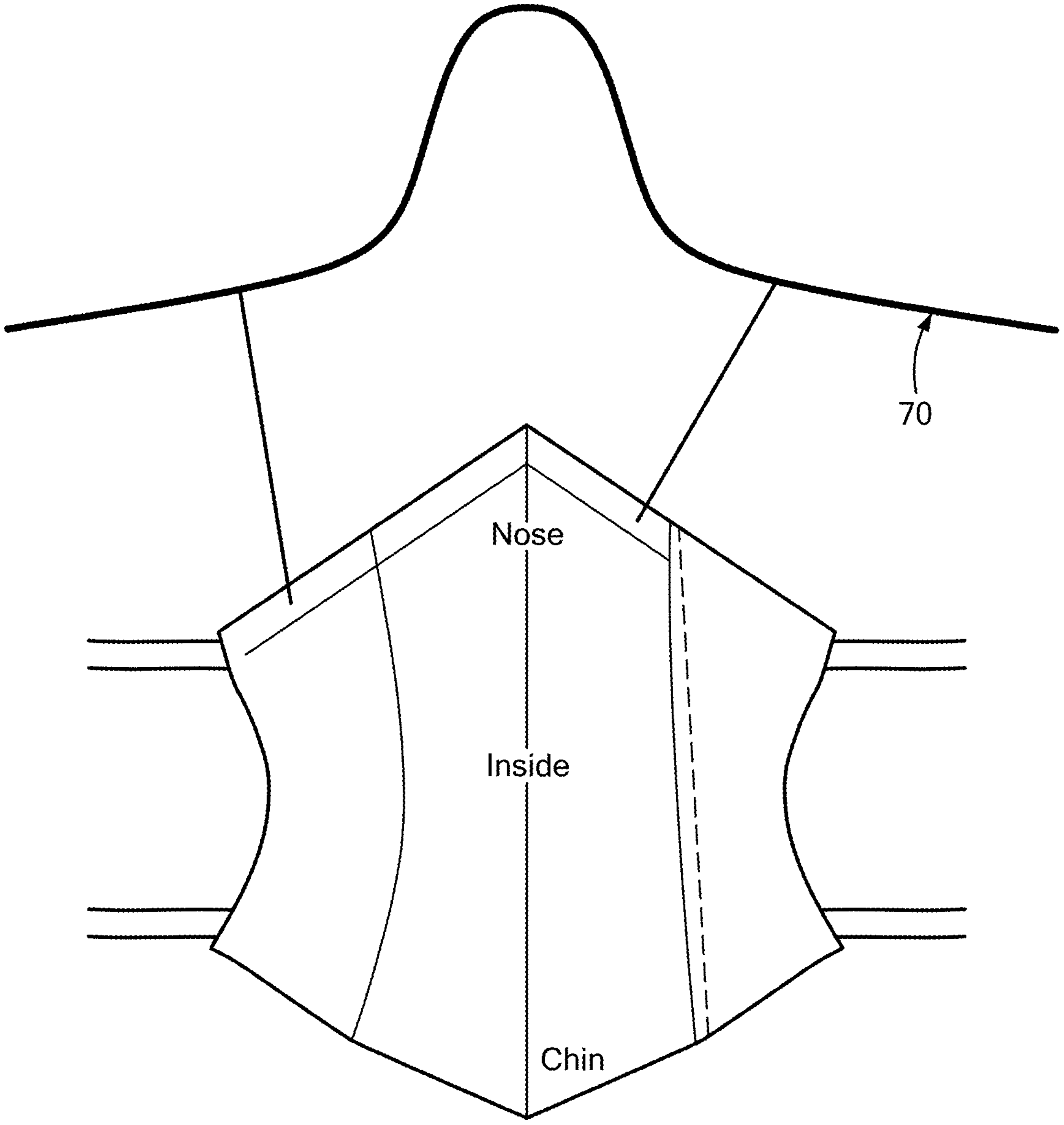
FIG. 9 is a front view illustrating a location of a nose wire for enabling increased sealing of a facemask assembly against a face.
Figure 10:
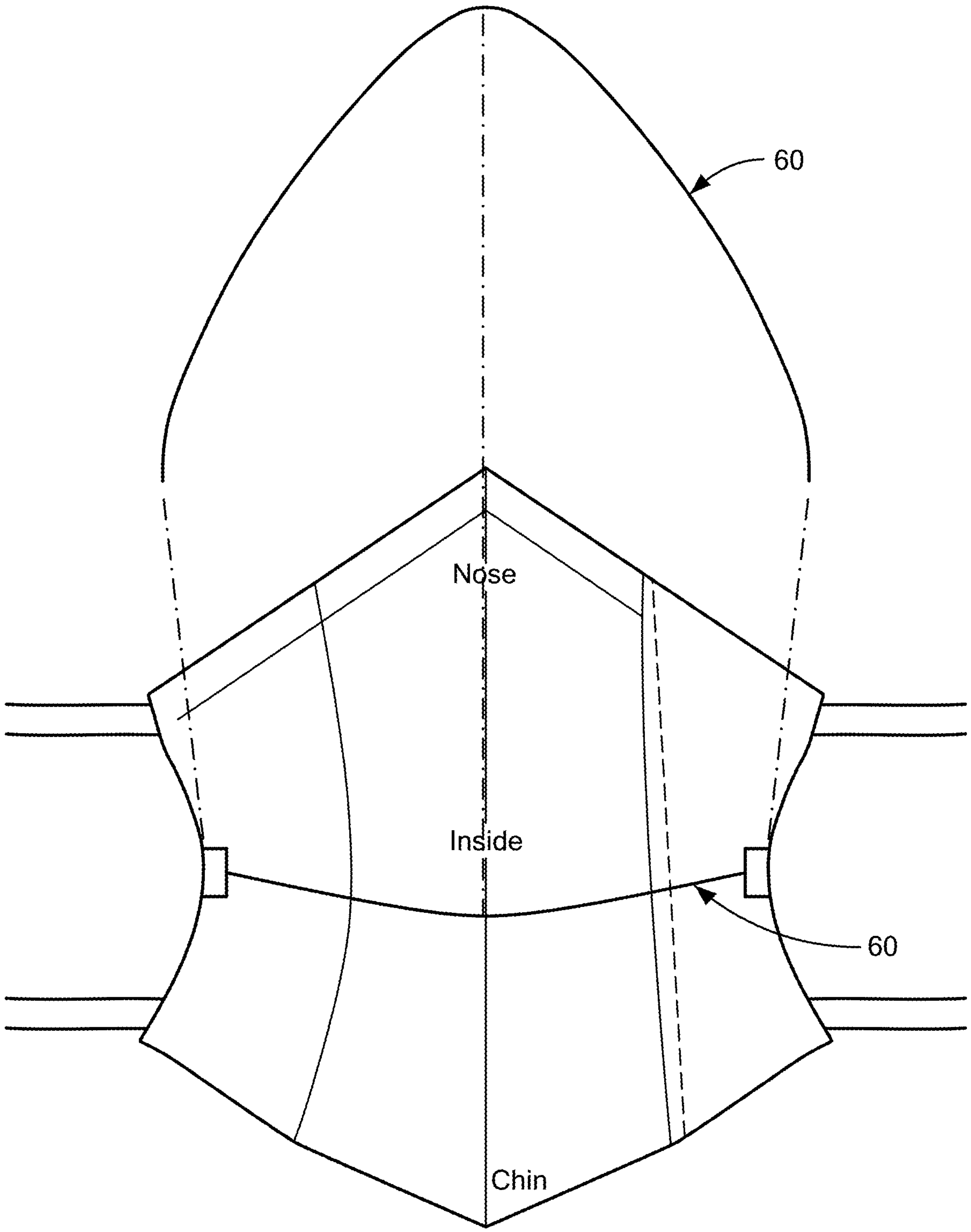
FIG. 10 is a front view illustrating a location of an embodiment of a face stiffener.

The facemask assembly can include a resilient and/or malleable nose wire 70 along the upper edges between the outer shell layer and the inner lining layer. See FIG. 9. The nose wire can allow a user to form the nose bridge of the shaped mask to fit the user's nose bridge. The nose wire should be able to be comfortably pressed against the nose bridge for a custom fit, while staying in place after release of pressure. The nose wire can be disposed within a tube of fabric formed along the upper edge or nose bridge region of the facemask panel. In this manner, the face mask assembly can be conformed more closely to the user's face. Any suitable wire can be used, such as 16 to 20 gauge wire of aluminum or a malleable polyethylene. The wire can be coated or uncoated.

Figure 13:
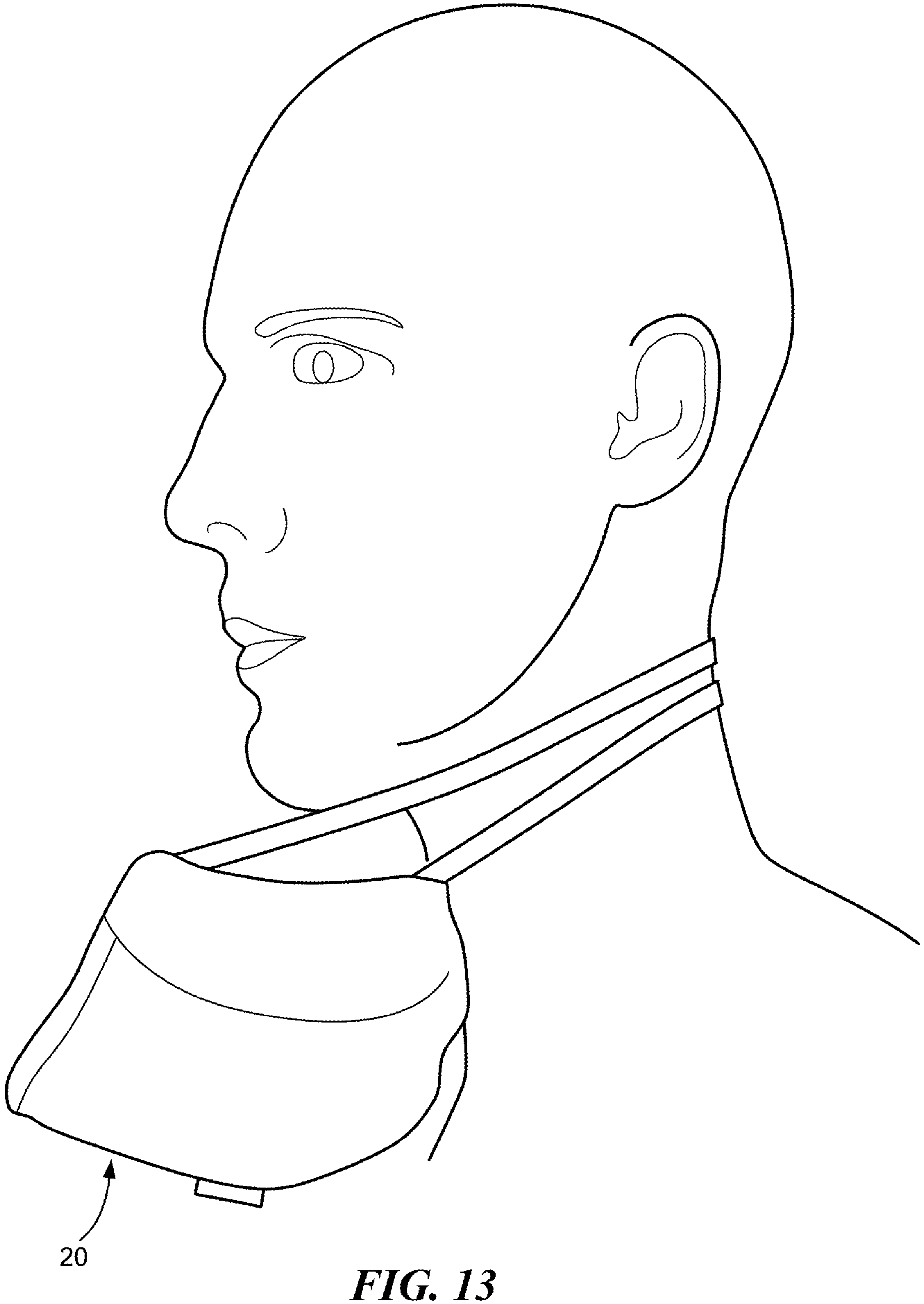
FIG. 13 is a schematic illustration of the facemask assembly of FIG. 1 pulled below a user's chin.
Figure 14:
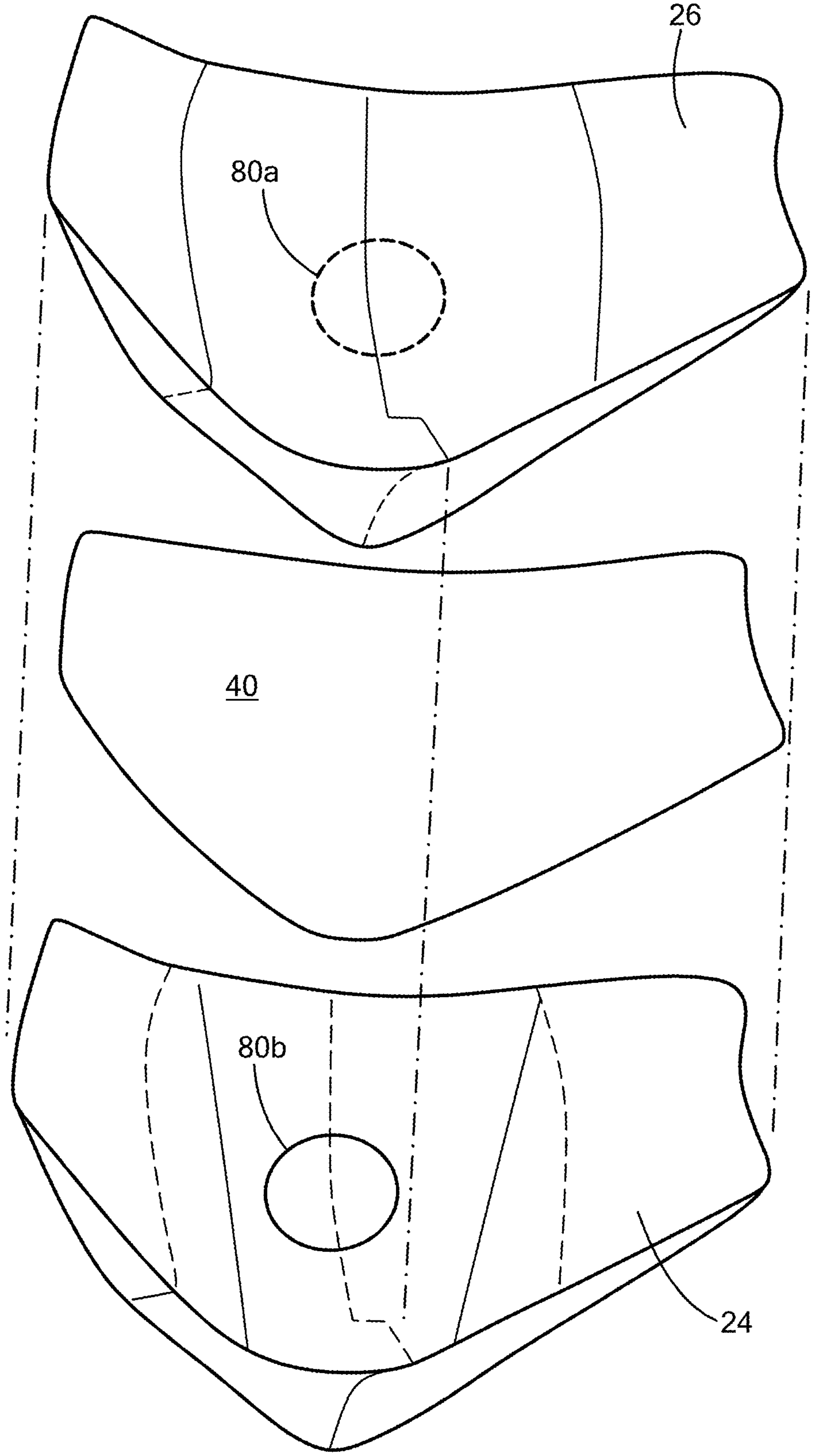
FIG. 14 is an exploded view of a further embodiment of a facemask assembly.

Referring to FIG. 13, the facemask assembly can be pulled down or "shelved" at the front of the user's neck without touching the shaped mask. The user can pull the facemask assembly down by the attachment straps, and the bottom portion of the mask can hinge out. In this manner, the user can lower the facemask assembly from the face when it is safe to so and the facemask assembly can retain its three-dimensional shape.

In some embodiments, a pair of magnets 80*a*, 80*b* can be affixed in the interior space, one magnet on the interior side of the inner lining layer and one magnet on the interior side of the outer shell layer. The magnets can adhere together, through the filter. In this manner, the magnets aid in retaining the facemask assembly as a unit while also retaining the shaped mask in a position spaced away from the user's mouth while worn.

The facemask assembly can be fabricated in any suitable manner. The outer shell layer and inner lining layer can each be provided as two side panels and two center panels, as shown in FIG. 5 and as noted above. Each side panel has a concave outer edge, a convex mid-line edge, and straight upper and lower edges. Each center panel has a convex center edge, a concave mid-line edge, a straight upper edge, a straight lower edge, and a straight chin-line edge extending from an end of the straight lower edge to a lower end of the concave mid-line edge.

Figure 5A:
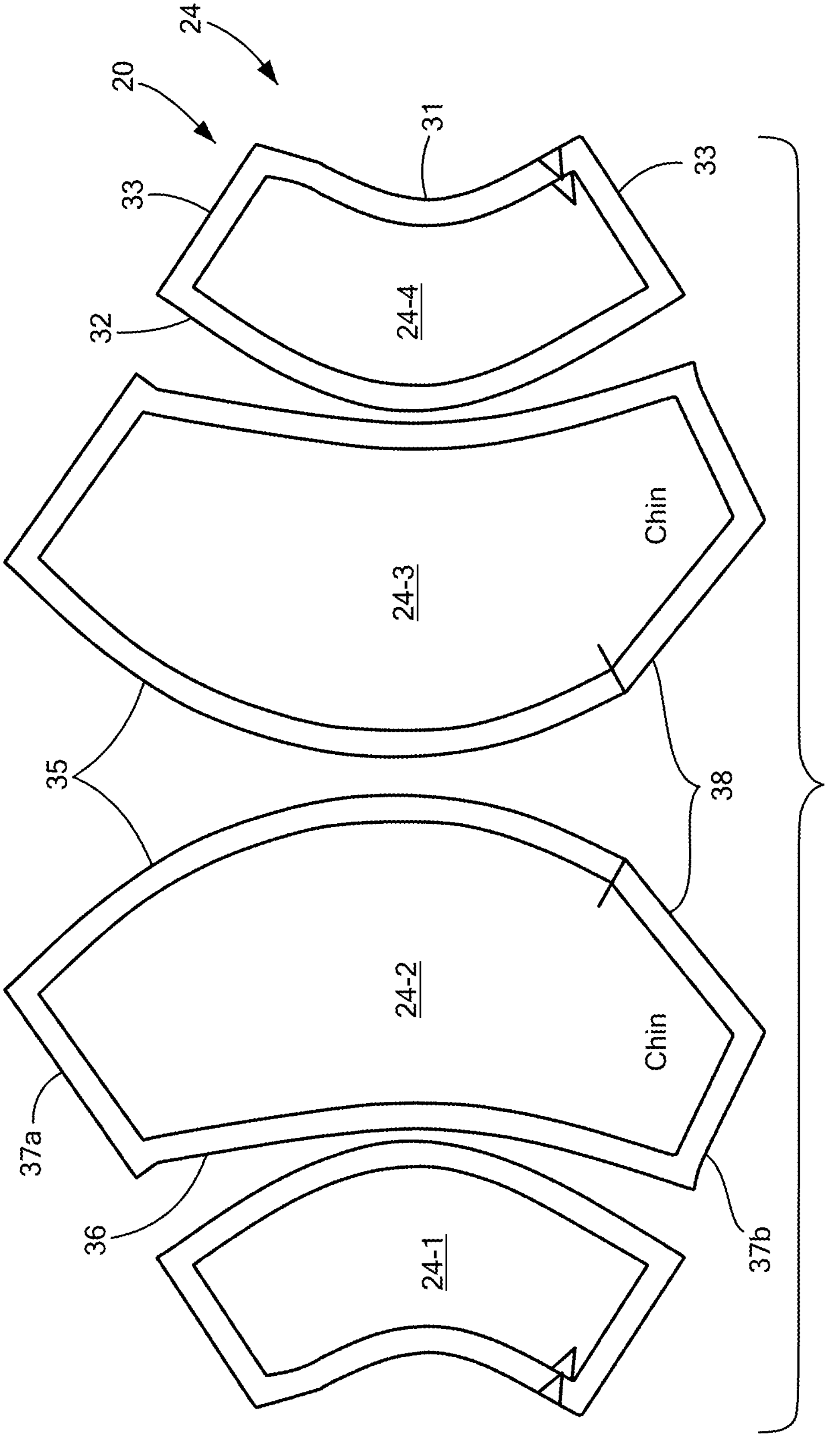
FIGS. 5A and 5B are plan views of panels of an outer shell layer and an inner lining layer, also illustrating exemplary seam line locations.
Figure 5B:
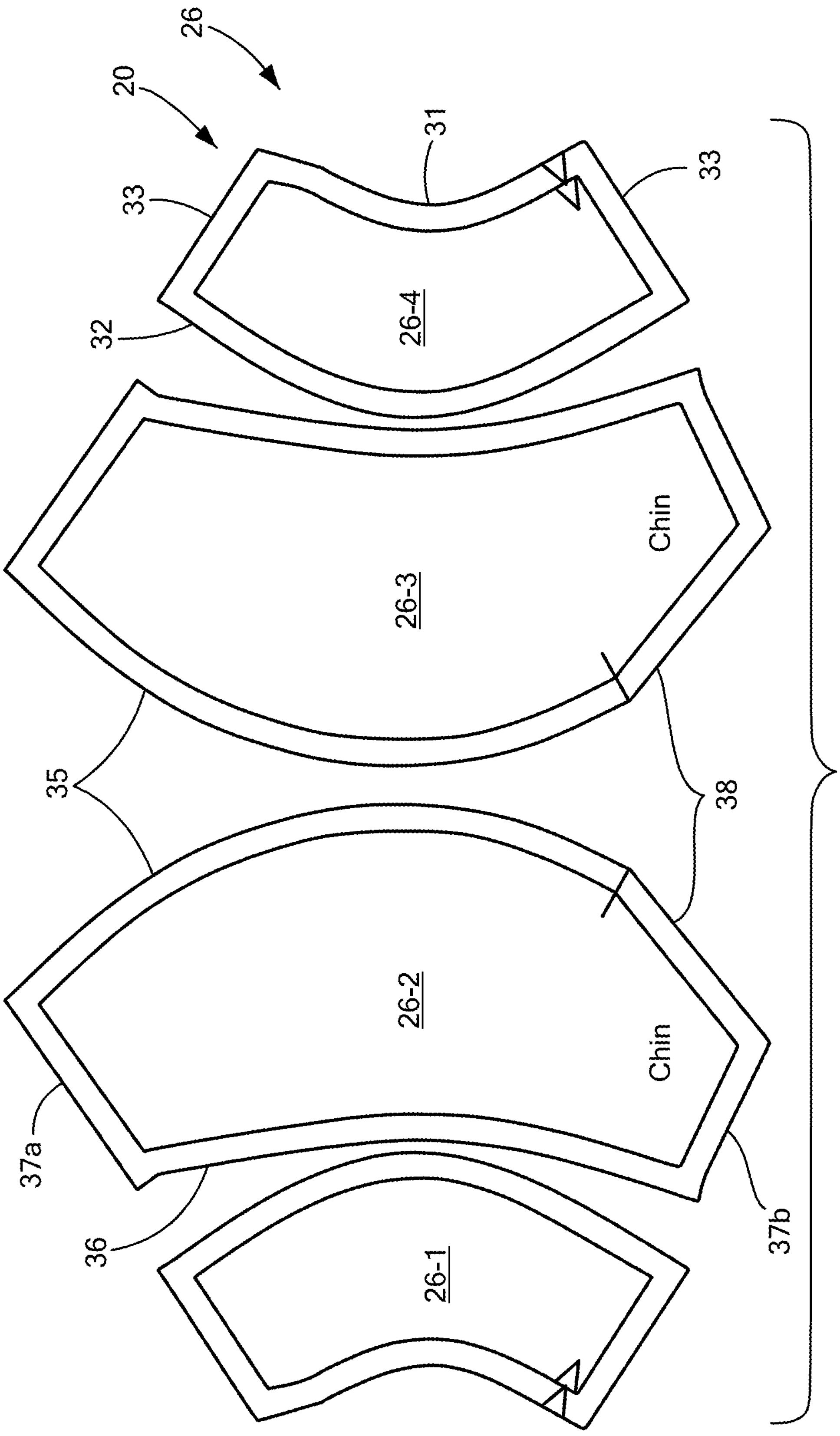

In some embodiments, the outer shell layer can be constructed as follows. With the panels laid out as shown in FIGS. 5A and 5B, each side panel can be connected to its adjacent center panel, for example, by stitching the convex mid-line edge of the side panel to the concave mid-line edge of the center panel. The two center panels can be connected, for example, by stitching the adjacent convex center edges and straight chin-line edges together. Any suitable stitching to form a seam can be used, such as serging or straight-line stitching. The adjustment tab can be inserted during stitching of the two center panels of the outer shell layer together. The attachment of convex to concave edges and convex to convex edges provides the three-dimensional shape to the shaped mask.

Construction of the inner lining layer can be similar to the construction of the outer shell layer. However, as noted above, in some embodiments, one side panel is not connected to an adjacent center panel, but is left unconnected to provide the mid-cheek slot for insertion or removal of the filter. The edges of this side panel and adjacent center panel can be finished in any suitable manner, such as by folding over ⅛ inch twice and straight stitching or serging ¼ inch, folding and straight stitching. The edges of the one side panel and the adjacent center panel also preferably overlap to ensure coverage of the filter when inserted in the interior space.

Figure 15A:
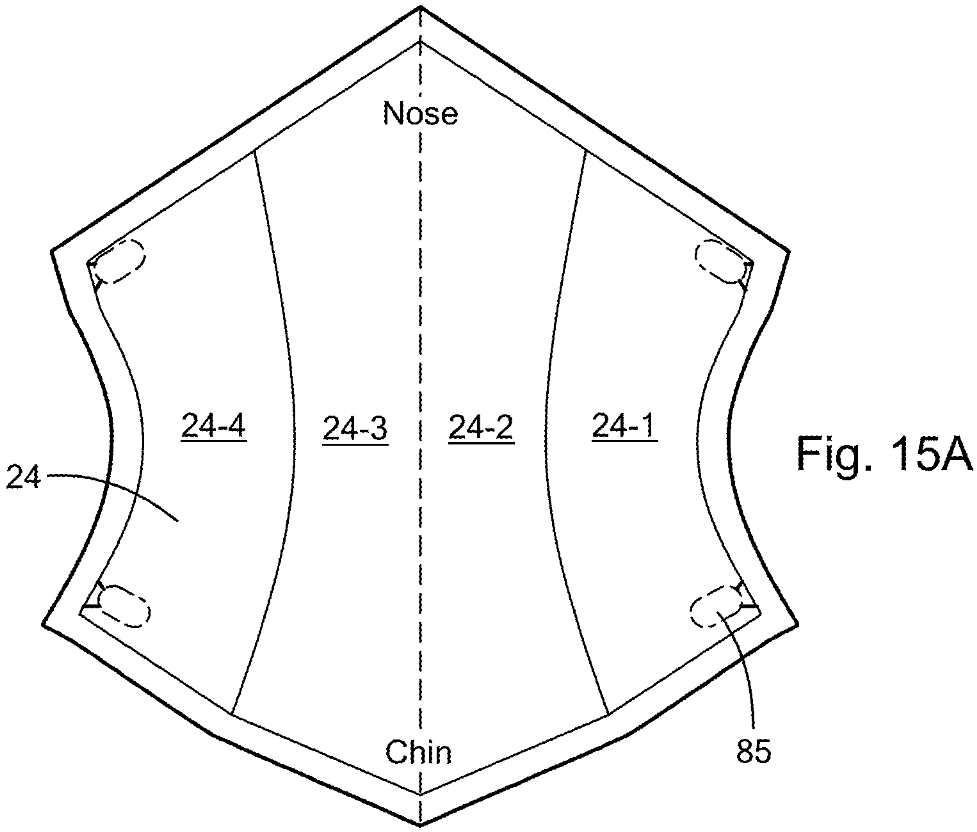
FIGS. 15A and 15B are schematic illustrations of construction of a facemask assembly shown from the outer shell layer side (FIG. 15A) and the inner shell layer side (FIG. 15B).
Figure 15B:
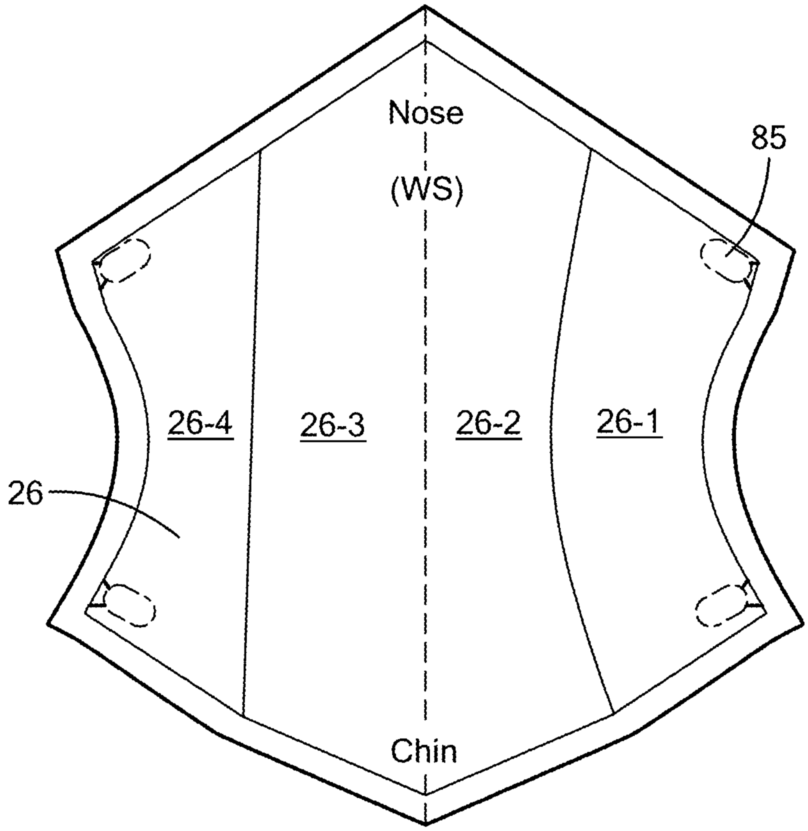

Next the assembled panels of the outer shell layer and assembled panels of the inner lining layer joined together. In some embodiments, the outer shell layer and assembled panels of the inner lining layer are laid together, with their right sides or outwardly facing sides together. See FIG. 15. The assembled panels are then connected together around the periphery, for example, by stitching. Any suitable stitching to form a seam can be used, such as serging or straight-line stitching. In some embodiments, attachment members can be fastened within the peripheral seam at this time. Holders or pockets for the face stiffener can also be fastened within the peripheral seam at this time. The shaped mask is then turned right side out through the mid-cheek slot.

A tube for the nose wire can be attached and a nose wire inserted therein, typically after turning the shaped facemask panel right side out, although in some embodiments a nose wire tube could be formed and a nose wire inserted prior to turning the facemask panel right side out. The face stiffener can be inserted into the holders either before or after turning the shaped facemask panel right side out.

In some embodiments, the outer shell layer and the inner lining layer can be attached by magnetic fasteners, such as pair of small magnets, or snap fasteners 85 applied along the periphery, for example, at the four perimeter corners. See FIG. 12. In some embodiments, the filter 40' can also be retained between the outer shell layer and the inner lining layer by the magnets.

In some embodiments, the seams between the panels of the outer shell panel and the inner lining panel and the seams joining the outer shell panel and the inner lining panel about their periphery can be formed by other fastening techniques, such as ultrasonic welding or an adhesive.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A facemask assembly, comprising:

(i) an outer shell layer and an inner lining layer, joined together about a periphery to form a facemask panel having an interior space to hold a filter material, each layer comprising two side panels and two center panels, wherein:

each side panel, when flat, has a concave outer edge, a convex mid-line edge, and straight upper and lower edges, each center panel, when flat, has a convex center edge, a concave mid-line edge, a straight upper edge, a straight lower edge, and a straight chin-line edge extending from an end of the straight lower edge to a lower end of the convex center edge, wherein in the outer shell layer:

the center panels are joined along the respective convex center edges and along the respective chin-line edges to form an outer layer three-dimensional central face seam, and each side panel and a corresponding one of each center panel are joined along the respective convex mid-line edge and concave mid-line edge to form a three-dimensional mid-cheek seam;

wherein in the inner lining layer:

the center panels are joined along the respective convex center edges and along the respective chin-line edges to form an inner layer three-dimensional central face seam, one of the side panels and a corresponding one of the center panels are joined along the respective convex mid-line edge and concave mid-line edge to form a three-dimensional mid-cheek seam, the other of the side panels and a corresponding other one of the center panels are overlapped along the respective convex mid-line edge and concave mid-line edge to form a three-dimensional mid-cheek slot for insertion or removal of a filter material or are joined along the respective convex mid-line edge and concave mid-line edge to form a further three-dimensional mid-cheek seam;

wherein the outer shell layer and the inner lining layer are joined together about the periphery with the side panels aligned along the respective concave outer edges and the respective upper and lower edges, and with the center panels aligned along the respective upper and lower edges, to form the facemask panel having a three-dimensional facemask shape with side edges each having a selected shape, and with the three-dimensional central face seam extending generally vertically from a first region to a second region and having a selected shape, and the interior space between the outer shell layer and the inner lining layer to retain the filter material;

(ii) a face stiffener extending generally horizontally through the interior space along a mid-region of the facemask panel and being configured in a curve to provide stiffening of the facemask panel to form the three-dimensional facemask shape; and (iii) one or more attachment members attached at the side panels having a length to affix the facemask assembly.

2. The facemask assembly of claim 1, wherein the face stiffener comprises a resilient and/or malleable wire attached generally horizontally along the mid-region.

3. The facemask assembly of claim 1, further comprising a pocket or holder along each side edge of the facemask panel to retain respective ends of the face stiffener.

4. The facemask assembly of claim 1, further comprising a tube along an inner side of the facemask panel to retain the face stiffener.

5. The facemask assembly of claim 1, further comprising a tab extending outwardly from the three-dimensional face seam of the outer shell, the tab graspable to adjust the three-dimensional facemask shape.

6. The facemask assembly of claim 1, further comprising a pair of magnets disposed in the mid-region of the facemask panel, a first magnet attached on an interior side of the inner lining layer and a second magnet attached on an interior side of the outer shell layer, the pair of magnets aligned to magnetically adhere together.

7. The facemask assembly of claim 1, further comprising a resilient and/or malleable nose wire attached generally horizontally near the upper edge of the facemask panel to provide stiffening and shaping of the three-dimensional facemask shape.

8. The facemask assembly of claim 7, further comprising a tube disposed near the upper edge of the facemask panel and configured to retain the nose wire.

9. The facemask assembly of claim 1, wherein the outer shell layer and the inner lining layer are formed form a fabric selected from the group consisting of natural fibers, synthetic fibers, or a blend of at least two of the aforementioned.

10. The facemask assembly of claim 1, wherein the outer shell layer and the inner lining layer are formed from a fabric selected from the group consisting of a cotton material, a polyester material, a nylon material, or a blend at least two of the aforementioned.

11. The facemask assembly of claim 1, further comprising a filter material within the interior space.

12. The facemask assembly of claim 11, wherein the filter material is a meltblown polypropylene.

13. The facemask assembly of claim 11, wherein the filter material is selected to trap at least 81% of particles ranging from 0.3 to 10 microns.

14. The facemask assembly of claim 11, wherein the filter material has a periphery that conforms to the interior space, the periphery including a notch to fit around a chin region in the interior space.

15. The facemask assembly of claim 1, wherein the one or more attachment members include one or more of a fabric tie, an elastic member, and a hook.

16. The facemask assembly of claim 1, wherein the outer shell layer and the inner lining layer are joined together about the periphery with one or more of stitching, ultrasonic welding, adhesive, magnetic fasteners, and snap fasteners.

17. The facemask assembly of claim 1, further comprising one or more attachment points for the filter material, the attachment points including one or more of magnetic fasteners and snap fasteners.

18. The facemask assembly of claim 17, wherein the one or more attachment points for the filter material are disposed in a mid-region of the facemask panel and/or at locations about the periphery of the facemask panel.

19. The facemask assembly of claim 17, wherein the one or more attachment points are disposed at corner locations of the periphery of the facemask panel.

* * * * *